(12) United States Patent
Mendenhall

(10) Patent No.: US 7,926,644 B2
(45) Date of Patent: Apr. 19, 2011

(54) THREE-DIMENSIONAL MOTION USING SINGLE-PATHWAY BASED ACTUATORS

(75) Inventor: Jesse Mendenhall, Brookline, NH (US)

(73) Assignee: Magnemotion, Inc., Acton, MA (US)

( * ) Notice: Subject to any disclaimer, the term of this patent is extended or adjusted under 35 U.S.C. 154(b) by 42 days.

(21) Appl. No.: 12/259,928

(22) Filed: Oct. 28, 2008

(65) Prior Publication Data
US 2009/0107806 A1 Apr. 30, 2009

Related U.S. Application Data

(63) Continuation of application No. 11/123,385, filed on May 6, 2005, now Pat. No. 7,458,454.

(60) Provisional application No. 60/569,168, filed on May 7, 2004, provisional application No. 60/669,057, filed on Apr. 6, 2005.

(51) Int. Cl.
*H02K 41/00* (2006.01)
*B65G 25/04* (2006.01)
*G05B 11/00* (2006.01)

(52) U.S. Cl. ............. 198/463.2; 198/377.02; 198/463.3; 198/750.14

(58) Field of Classification Search ............. 198/370.04, 198/370.05, 377.02, 463.2, 463.3, 617, 619, 198/621.3, 750.14, 750.2; 246/282, 283; 104/49, 99–102; 310/114; 318/135, 687, 318/700
See application file for complete search history.

(56) References Cited

U.S. PATENT DOCUMENTS 3,029,893 A 4/1962 Mountjoy
3,376,578 A 4/1968 Sawyer
(Continued)

FOREIGN PATENT DOCUMENTS

DE 2532269 A1 2/1977
(Continued)

OTHER PUBLICATIONS

Ackermann et al., "Novel Technique for Reducing Cogging Torque in a Class of Brushless DC Motors", IEE Proceedings-B, vol. 139, No. 4, Jul. 1992.

(Continued)

*Primary Examiner* — Douglas A Hess
(74) *Attorney, Agent, or Firm* — Nutter McClennen & Fish LLP; David J. Powsner; Christopher J. Stow

(57) ABSTRACT

The invention provides novel mechanisms and methods for effecting rotational and translational motion in three dimensions of objects carried by, or coupled to, actuators that move along a pathway. Vehicles or other conveyances (collectively, "vehicles") that utilize mechanisms and methods can increase the performance of and decrease the cost of transportation, shipping, manufacturing, materials handling and other systems. In one aspect, the illustrated embodiment provides such a vehicle or other conveyance having two (or more) actuators adapted for movement along a pathway. The actuators are propelled or otherwise capable of motion, relative to each other so that the distance between can be increased or decreased. When desired, that distance can also be maintained the same, e.g., regardless of whether the actuators are moving. A pallet, carriage or other moveable part (collectively, pallet) is moveably coupled to the actuators so that at least selected motions by the actuators relative to one another on the pathway effect rotational and/or translational motion of the pallet in three dimensions relative to the pathway, including, for example, movement transverse to the pathway and out of a plane of the pathway.

14 Claims, 17 Drawing Sheets

U.S. PATENT DOCUMENTS

| | | |
|---|---|---|
| 3,440,600 A | 4/1969 | Frech et al. |
| 3,532,934 A | 10/1970 | Ballman |
| 3,609,676 A | 9/1971 | Jauquet et al. |
| 3,617,890 A | 11/1971 | Kurauchi et al. |
| 3,628,462 A | 12/1971 | Holt |
| 3,636,508 A | 1/1972 | Ogilvy et al. |
| 3,638,093 A | 1/1972 | Ross |
| 3,679,874 A | 7/1972 | Fickenscher |
| 3,706,922 A | 12/1972 | Inagaki |
| 3,768,417 A | 10/1973 | Thornton et al. |
| 3,772,640 A | 11/1973 | Auer, Jr. et al. |
| 3,786,411 A | 1/1974 | Kurauchi et al. |
| 3,834,318 A | 9/1974 | Fellows et al. |
| 3,842,751 A | 10/1974 | Thornton et al. |
| 3,845,720 A | 11/1974 | Bohn et al. |
| 3,847,088 A | 11/1974 | Karch et al. |
| 3,850,108 A | 11/1974 | Winkle et al. |
| 3,858,521 A | 1/1975 | Atherton et al. |
| 3,860,300 A | 1/1975 | Lyman |
| 3,860,843 A | 1/1975 | Kawasaki et al. |
| 3,871,301 A | 3/1975 | Kolm et al. |
| 3,874,299 A | 4/1975 | Silva et al. |
| 3,882,789 A | 5/1975 | Simon et al. |
| 3,899,979 A | 8/1975 | Godsey, Jr. |
| 3,906,436 A | 9/1975 | Kurauchi et al. |
| 3,912,992 A | 10/1975 | Lamb et al. |
| 3,927,735 A | 12/1975 | Miericke et al. |
| 3,937,148 A | 2/1976 | Simpson |
| 3,979,091 A | 9/1976 | Gagnon et al. |
| 4,023,753 A | 5/1977 | Dobler et al. |
| 4,061,089 A | 12/1977 | Sawyer |
| 4,065,706 A | 12/1977 | Gosling et al. |
| 4,088,379 A | 5/1978 | Perper |
| 4,132,175 A | 1/1979 | Miller et al. |
| 4,140,063 A | 2/1979 | Nakamura et al. |
| 4,292,465 A | 9/1981 | Wilson et al. |
| 4,361,202 A | 11/1982 | Minovitch |
| 4,424,463 A | 1/1984 | Musil |
| 4,441,604 A | 4/1984 | Schlig et al. |
| 4,522,128 A | 6/1985 | Anderson |
| 4,646,651 A | 3/1987 | Yamamura et al. |
| 4,665,829 A | 5/1987 | Anderson |
| 4,665,830 A | 5/1987 | Anderson et al. |
| 4,671,185 A | 6/1987 | Anderson et al. |
| 4,698,895 A | 10/1987 | Miller et al. |
| 4,711,182 A | 12/1987 | Alexandrov et al. |
| 4,714,400 A | 12/1987 | Barnett et al. |
| 4,726,299 A | 2/1988 | Anderson |
| 4,776,464 A | 10/1988 | Miller et al. |
| 4,794,865 A | 1/1989 | Lindberg |
| 4,800,328 A | 1/1989 | Bolger et al. |
| 4,811,667 A | 3/1989 | Morishita et al. |
| 4,829,445 A | 5/1989 | Burney |
| 4,836,344 A | 6/1989 | Bolger |
| 4,847,526 A | 7/1989 | Takehara et al. |
| 4,893,071 A | 1/1990 | Miller |
| 4,914,539 A | 4/1990 | Turner et al. |
| 4,953,470 A | 9/1990 | Yamaguchi et al. |
| 4,972,779 A | 11/1990 | Morishita et al. |
| 5,032,746 A | 7/1991 | Ueda et al. |
| 5,032,747 A | 7/1991 | Sakamoto et al. |
| 5,108,052 A | 4/1992 | Malewicki et al. |
| 5,126,606 A | 6/1992 | Hofmann et al. |
| 5,152,227 A | 10/1992 | Kato et al. |
| 5,161,758 A | 11/1992 | Shuto et al. |
| 5,178,037 A | 1/1993 | Mihirogi et al. |
| 5,180,041 A | 1/1993 | Shuto et al. |
| 5,193,767 A | 3/1993 | Mihirogi et al. |
| 5,199,674 A | 4/1993 | Mihirogi et al. |
| 5,214,323 A | 5/1993 | Ueda et al. |
| 5,214,981 A | 6/1993 | Weinberger et al. |
| 5,225,726 A | 7/1993 | Tozoni |
| 5,242,136 A | 9/1993 | Cribbens et al. |
| 5,247,890 A | 9/1993 | Mihirogi et al. |
| 5,251,563 A | 10/1993 | Staehs et al. |
| 5,263,670 A | 11/1993 | Colbaugh et al. |
| 5,267,514 A | 12/1993 | Staehs et al. |
| 5,277,124 A | 1/1994 | DiFonso et al. |
| 5,277,125 A | 1/1994 | DiFonso et al. |
| 5,293,308 A | 3/1994 | Boys et al. |
| 5,325,974 A | 7/1994 | Staehs |
| 5,368,425 A | 11/1994 | Mills et al. |
| 5,370,059 A | 12/1994 | Raschbichler et al. |
| 5,409,095 A | 4/1995 | Hoshi et al. |
| 5,435,429 A | 7/1995 | Van Den Goor et al. |
| 5,444,341 A | 8/1995 | Kneifel, II et al. |
| 5,450,305 A | 9/1995 | Boys et al. |
| 5,452,663 A | 9/1995 | Berdut |
| 5,467,718 A | 11/1995 | Shibata et al. |
| 5,517,924 A | 5/1996 | He et al. |
| 5,519,266 A | 5/1996 | Chitayat |
| 5,521,451 A | 5/1996 | Oudet et al. |
| 5,523,637 A | 6/1996 | Miller |
| 5,528,113 A | 6/1996 | Boys et al. |
| 5,551,350 A | 9/1996 | Yamada et al. |
| 5,573,090 A | 11/1996 | Ross |
| 5,590,604 A | 1/1997 | Lund |
| 5,590,995 A | 1/1997 | Berkers et al. |
| 5,592,158 A | 1/1997 | Riffaud et al. |
| 5,595,121 A | 1/1997 | Elliott et al. |
| 5,619,078 A | 4/1997 | Boys et al. |
| 5,642,013 A | 6/1997 | Wavre |
| 5,708,427 A | 1/1998 | Bush |
| 5,709,291 A | 1/1998 | Nishino et al. |
| 5,720,454 A | 2/1998 | Bachetti et al. |
| 5,722,326 A | 3/1998 | Post |
| 5,723,917 A | 3/1998 | Chitayat |
| 5,757,100 A | 5/1998 | Burgbacher et al. |
| 5,757,288 A | 5/1998 | Dixon et al. |
| 5,763,966 A | 6/1998 | Hinds |
| 5,821,638 A | 10/1998 | Boys et al. |
| 5,839,554 A | 11/1998 | Clark et al. |
| 5,839,567 A | 11/1998 | Kyotani et al. |
| 5,898,579 A | 4/1999 | Boys et al. |
| 5,900,728 A | 5/1999 | Moser et al. |
| 5,906,647 A | 5/1999 | Zyburt et al. |
| 5,910,691 A | 6/1999 | Wavre et al. |
| 5,927,657 A | 7/1999 | Takasan et al. |
| 5,938,577 A | 8/1999 | Lindem |
| 5,952,743 A | 9/1999 | Sidey et al. |
| 5,962,937 A | 10/1999 | Wavre |
| 5,990,592 A | 11/1999 | Miura et al. |
| 6,005,511 A | 12/1999 | Young et al. |
| 6,008,552 A | 12/1999 | Yagoto et al. |
| 6,011,508 A | 1/2000 | Perreault et al. |
| 6,025,659 A | 2/2000 | Nashiki |
| 6,032,110 A | 2/2000 | Ishihara et al. |
| 6,034,499 A | 3/2000 | Tranovich |
| 6,044,770 A | 4/2000 | Davey et al. |
| 6,064,301 A | 5/2000 | Takahashi et al. |
| 6,081,058 A | 6/2000 | Suzuki et al. |
| 6,087,742 A | 7/2000 | Maestre |
| 6,089,512 A | 7/2000 | Ansorge et al. |
| 6,100,821 A | 8/2000 | Tanji et al. |
| 6,101,952 A | 8/2000 | Thornton et al. |
| 6,104,117 A | 8/2000 | Nakamura et al. |
| 6,137,424 A | 10/2000 | Cohen et al. |
| 6,147,421 A | 11/2000 | Takita et al. |
| 6,175,169 B1 | 1/2001 | Hollis, Jr. et al. |
| 6,225,919 B1 | 5/2001 | Lumbis et al. |
| 6,242,822 B1 | 6/2001 | Strothmann et al. |
| 6,286,434 B1 | 9/2001 | Fischperer et al. |
| 6,326,708 B1 | 12/2001 | Tsuboi et al. |
| 6,376,957 B1 | 4/2002 | Haydock et al. |
| 6,414,742 B1 | 7/2002 | Korenaga et al. |
| 6,417,584 B1 * | 7/2002 | Chitayat .................. 310/12.19 |
| 6,417,914 B1 | 7/2002 | Li |
| 6,418,857 B1 | 7/2002 | Okano et al. |
| 6,445,093 B1 | 9/2002 | Binnard |
| 6,499,701 B1 | 12/2002 | Thornton et al. |
| 6,534,894 B1 | 3/2003 | Flowerday et al. |
| 6,646,721 B2 | 11/2003 | Compter et al. |
| 6,684,794 B2 | 2/2004 | Fiske et al. |
| 6,703,806 B2 | 3/2004 | Joong et al. |
| 6,781,524 B1 | 8/2004 | Clark et al. |
| 6,788,385 B2 | 9/2004 | Tanaka et al. |
| 6,911,747 B2 | 6/2005 | Tsuboi et al. |

| | | | |
|---|---|---|---|
| 6,917,136 B2 | 7/2005 | Thornton et al. | |
| 6,930,413 B2 | 8/2005 | Marzano | |
| 6,983,701 B2 | 1/2006 | Thornton et al. | |
| 7,009,683 B2 | 3/2006 | Sato et al. | |
| 7,019,818 B2 | 3/2006 | Opower et al. | |
| 7,458,454 B2 | 12/2008 | Mendenhall | |
| 2005/0242675 A1 | 11/2005 | Thornton et al. | |
| 2005/0263369 A1 | 12/2005 | Mendenhall | |

FOREIGN PATENT DOCUMENTS

| | | |
|---|---|---|
| DE | 235786 C | 5/1986 |
| DE | 4114706 C1 | 10/1992 |
| DE | 19535856 A1 | 3/1997 |
| DE | 10000513 C1 | 9/2001 |
| EP | 0179188 A2 | 4/1986 |
| EP | 0229669 A2 | 7/1987 |
| EP | 0482424 A1 | 4/1992 |
| EP | 1283586 A1 | 2/2003 |
| JP | 44015850 Y1 | 7/1969 |
| JP | 63310357 A | 12/1988 |
| JP | 1136504 A | 5/1989 |
| JP | 01136504 A | 5/1989 |
| JP | 3029747 A | 2/1991 |
| JP | 8129336 A | 5/1996 |
| JP | 08205514 A | 8/1996 |
| JP | 8205514 A | 8/1996 |
| JP | 2004112864 A | 4/2004 |
| KR | 914927 | 3/1991 |
| KR | 20030006756 A | 1/2003 |
| KR | 20030013868 A | 2/2003 |
| KR | 20030057995 A | 7/2003 |
| SU | 1140212 A1 | 2/1985 |
| WO | WO-9521405 A2 | 8/1995 |

OTHER PUBLICATIONS

Basak, Amitava. Permanent-Magnet DC Linear Motors (Clarendon Press Oxford, 1996), Table of Contents (pp. ix-xi), Chapter 2 "Types of DC Linear Motor" (pp. 21-41) and Chapter 5 "Supports and Guidance" (pp. 90-104).

Breton, C., et al., "Influence of machine symmetry on reduction of cogging torque in permanent-magnet brushless motors". IEEE Transactions on Magnetics, vol. 36, Issue 5, Sep. 2000 (pp. 3819-3823).

Eghtesadi, M. "Inductive Power Transfer to an Electric Vehicle-Analytical Model," 40th IEEE Vehicular Technology Conference (May 6-9, 1990) Orlando, FL, pp. 100-104.

Gieras, Jacek F. et al. Linear Synchronous Motors: Transportation and Automation Systems (CRC Press: New York, 2000), Table of Contents, Chapter 6 "High Speed Maglev Transport" (pp. 177-215).

Hendershot et al., "Design of Brushless Permanent-Magnet Motors", pp. 3-48 to 3-67 and 5-28, Magna Physics Publ. & Clarendon Press, Oxford, 1994.

Hor, P. J.; Zhu, Z. Q.; Howe, D.; Rees-Jones, "Minimization of cogging force in a linear permanent magnet motor", IEEE Transactions on Magnetics, vol. 34, Issue 5, Sep. 1998, (pp. 3544-3547).

Hughes, Austin. Electric Motors and Drives (Newnes: Oxford, 1990), Table of Contents (pp. v-xiii), Chapter 9 "Synchronous, Switched Reluctanceand Brushless D.C. Drives," (pp. 293-315).

Hwang et al., "Various Design Techniques to Reduce Cogging Torque by Controlling Energy Variation in Permanent Magnet Motors", IEEE Transactions on Magnetics, vol. 37, No. 4, Jul. 2001. cited by other.

Li, Touzhu and Gordon Slemon, "Reduction of Cogging Torque in Permanent Magnet Motors", IEEE Transactions on Magnetics, vol. 24, No. 6, Nov. 1988, pp. 2901-2903.

Stevens, Bruce W. "Asynchronous Bidirectional Network Interface Enabling Seamless Concurrent Processing in a Distributed Heterogeneous Multiprocessor System," Serial No. 783,661, Filing Date Oct. 28, 1991, Office of the Chief of Naval Research.

Supplemental European Search Report, Application No. 05747729, mailed Jun. 3, 2009, 3 pages.

van Zyl et al., "Novel Secondary Design for a Linear Synchronous Motor Using a Split-Pole Magnet Arrangement," Africon, 1999 IEEE, vol. 2, Sep. 28-Oct. 1, 1999, pp. 627-630.

van Zyl, A.W. and C.F. Landy, "Reduction of cogging forces in a tubular linear synchronous motor by optimizing the secondary design", Africon Conference in Africa, 2002. IEEE Africon 6th, vol. 2, Oct. 2-4, 2002 (pp. 689-692).

Zhu, Z. O., et al., "Reduction of cogging forces in slotless linear permanent magnet motors", IEEE Proceedings—Electric Power Application, vol. 144, Issue 4, Jul. 1997 (pp. 277-282).

Zhu, Z. Q., et al., "Novel linear tubular brushless permanent magnet motor", Electrical Machines and Drives, 1997 Eighth International Conference on (Conf. Publ. No. 444), Sep. 1-3, 1997 (pp. 91-95).

Japanese Office Action, Japanese Application No. 2007-511616, dated Dec. 7, 2010.

* cited by examiner

Pallet Articulation Components - Pallet

Pallet Articulation Components - Platform

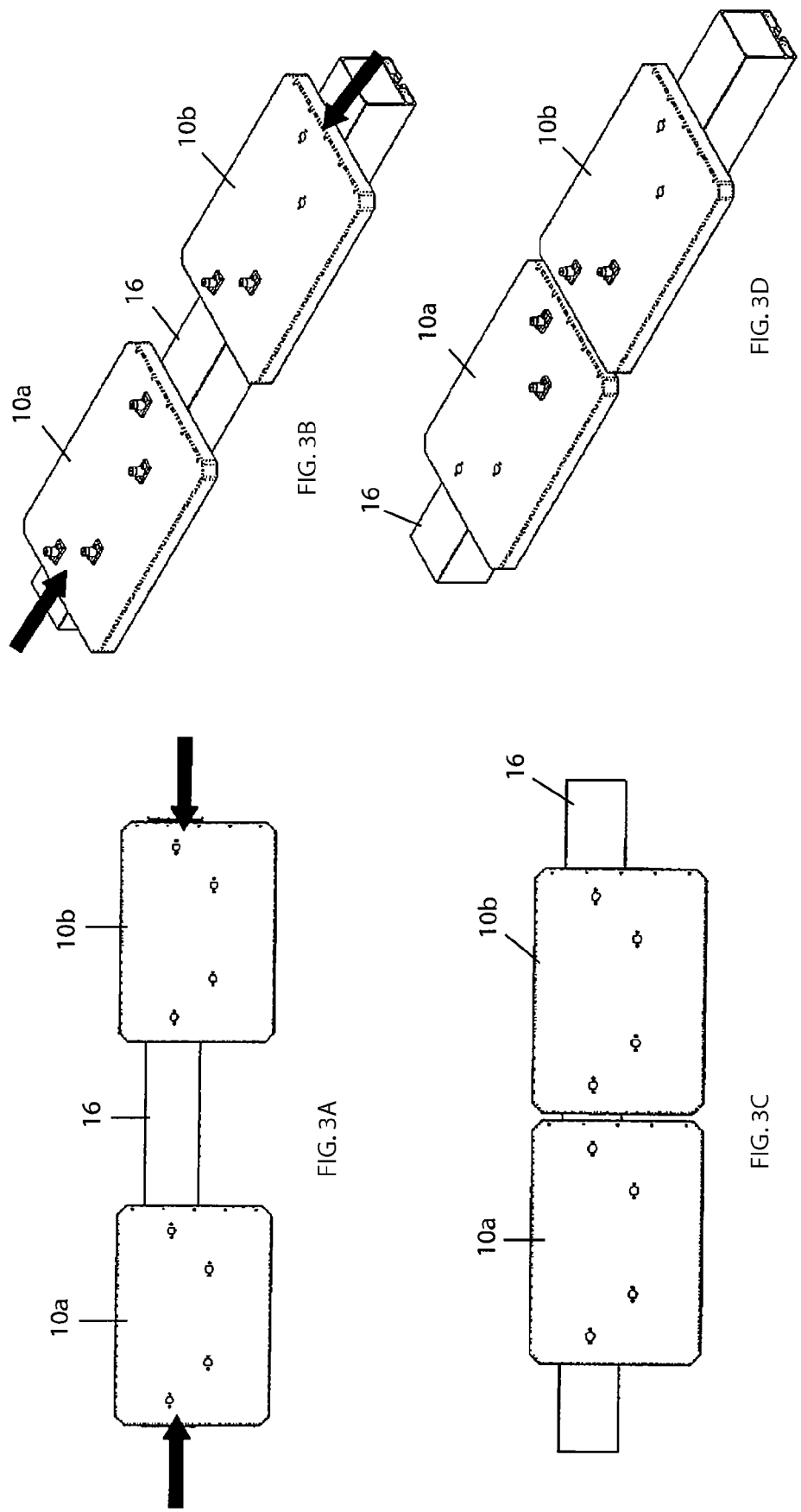

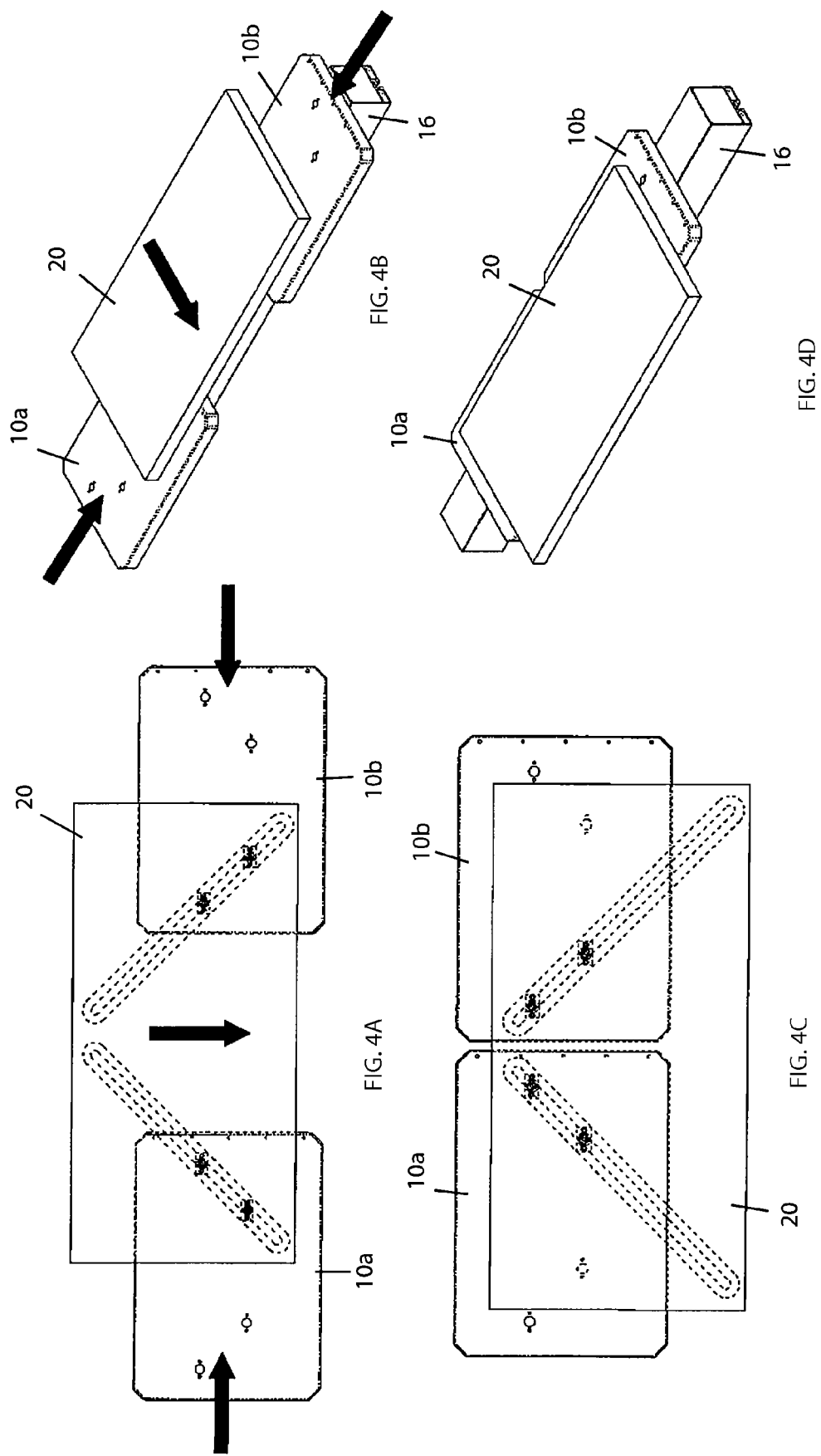

Pallet Articulation Examples – Vertically Mounted, Lateral Movement
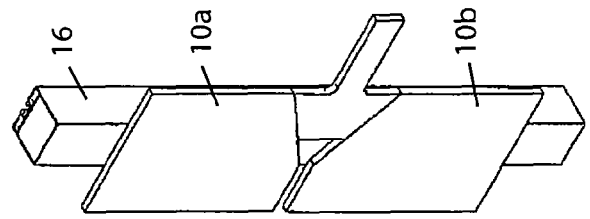
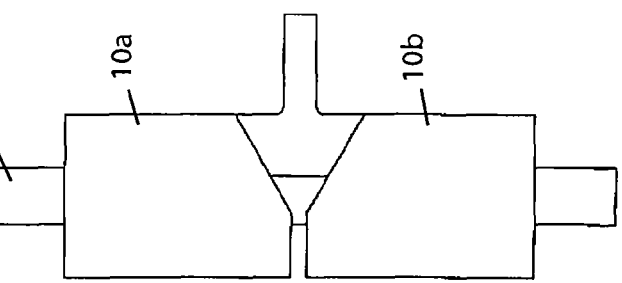
FIG. 5A
FIG. 5B
FIG. 5C
FIG. 5D

Pallet Articulation Examples – Tilting

Pallet Articulation Examples – Vertical Movement

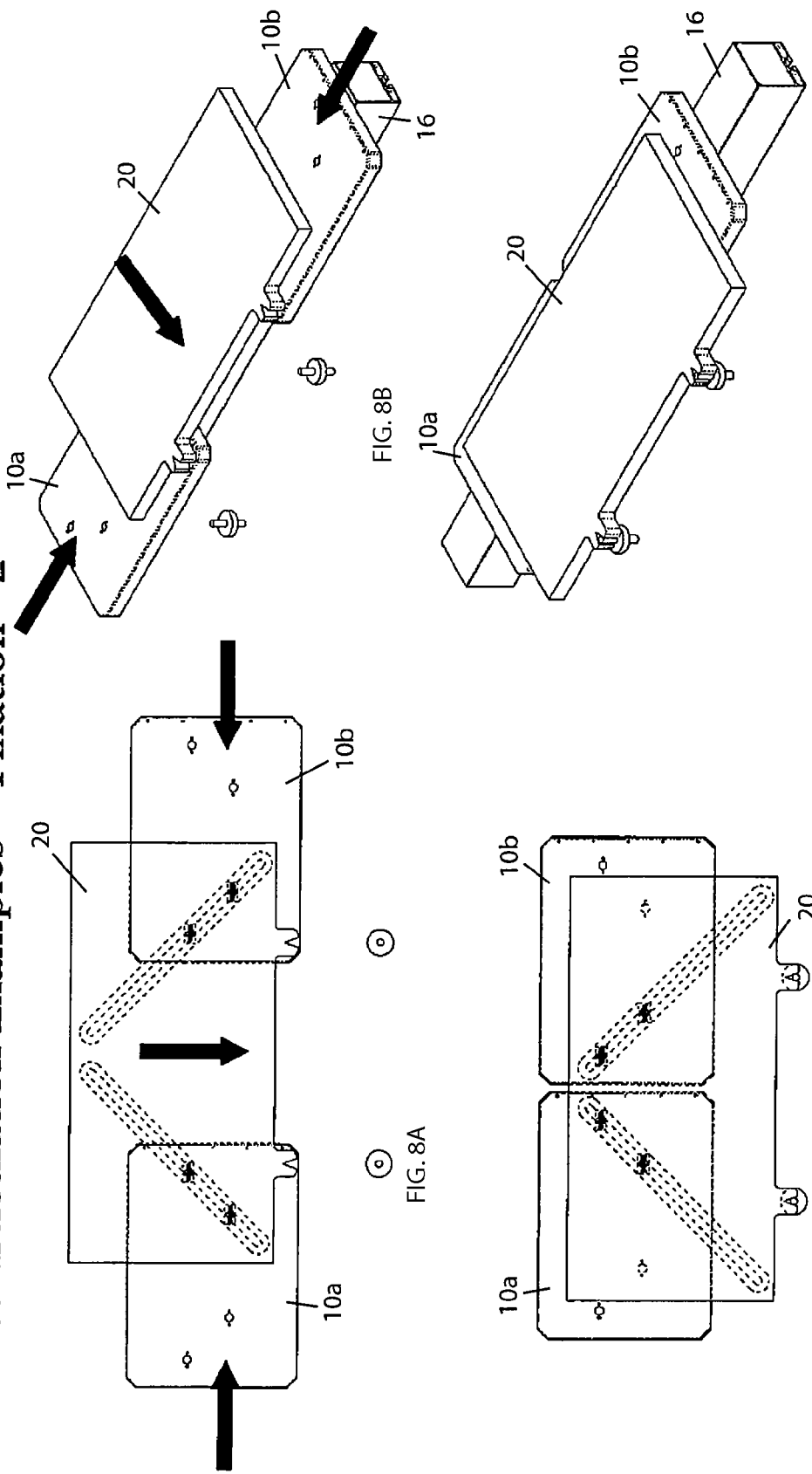

Pallet Articulation Examples – Rotational Movement
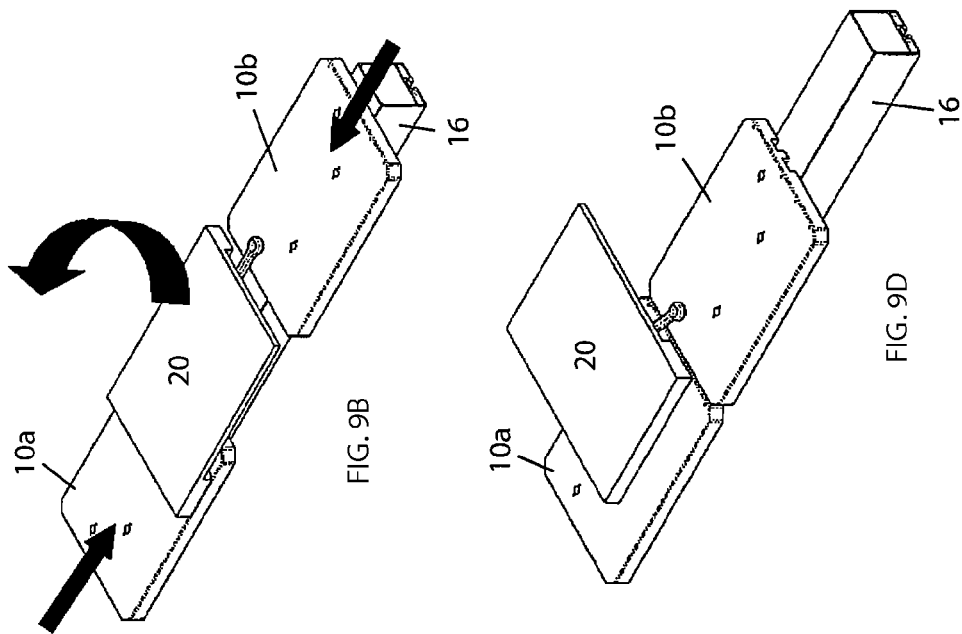
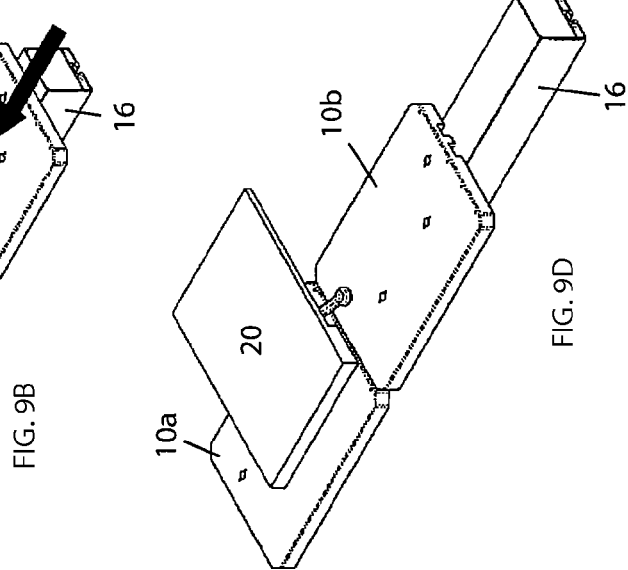
FIG. 9B
FIG. 9D
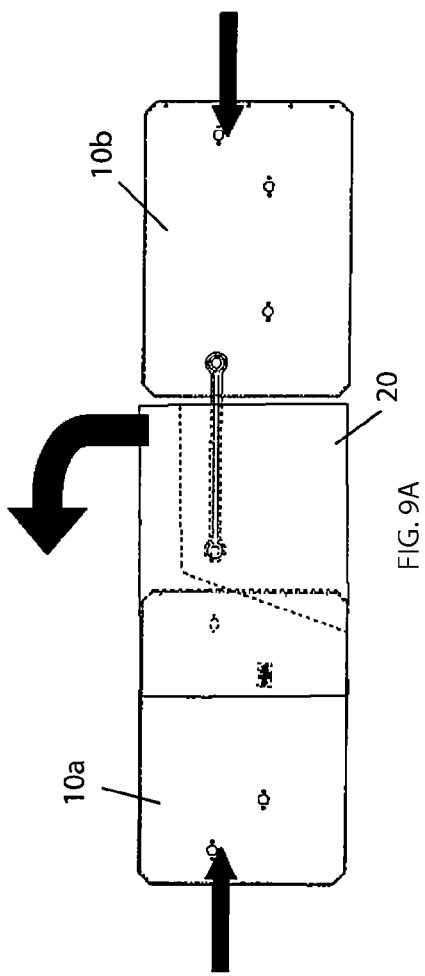
FIG. 9A
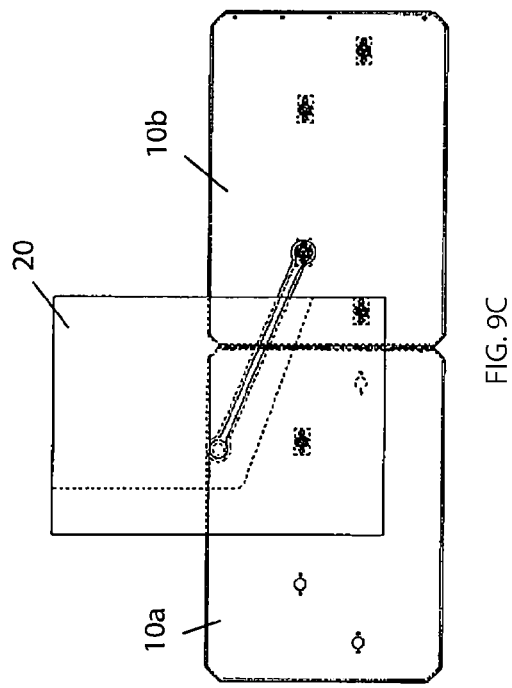
FIG. 9C

Pallet Articulation Examples – Cornering

Pallet Articulation Examples – Ejector Pin
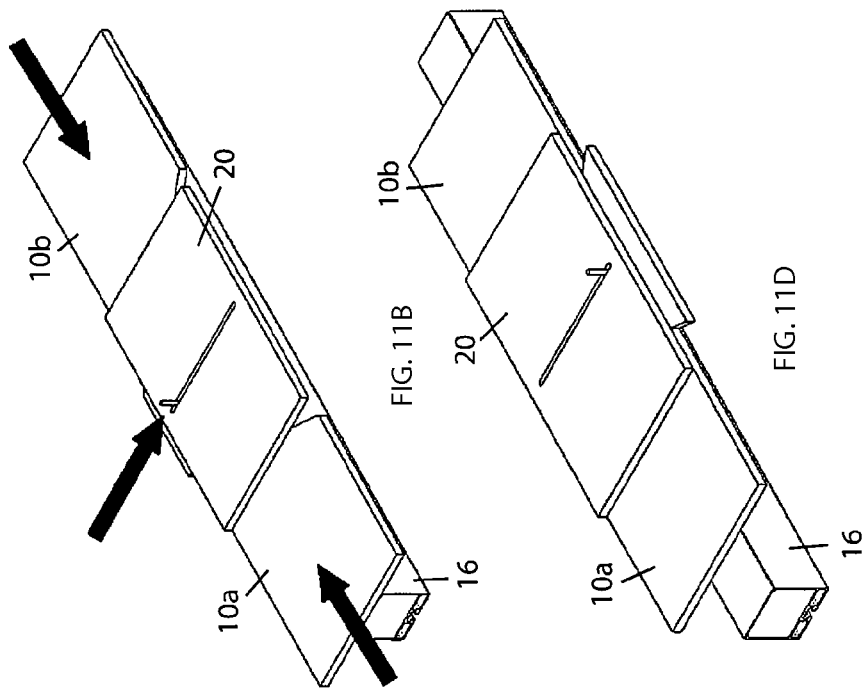
FIG. 11B
FIG. 11D
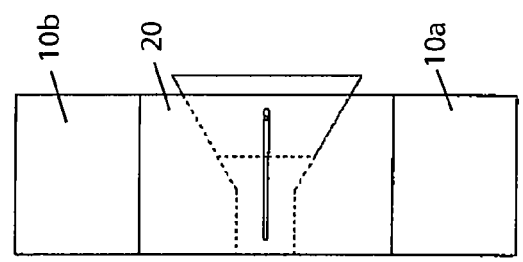
FIG. 11A
FIG. 11C
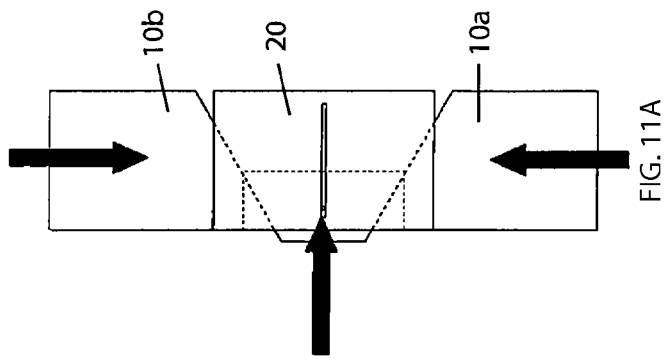

Pallet Articulation Examples – Switch
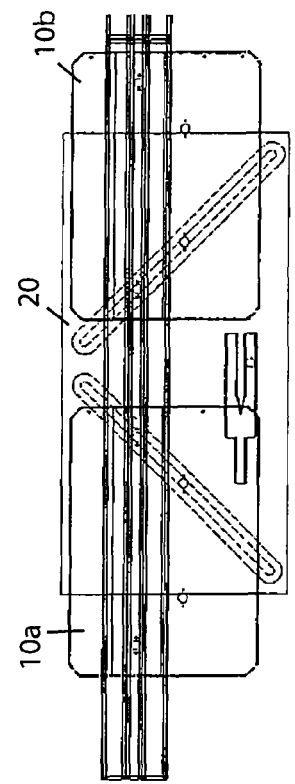
FIG. 12A
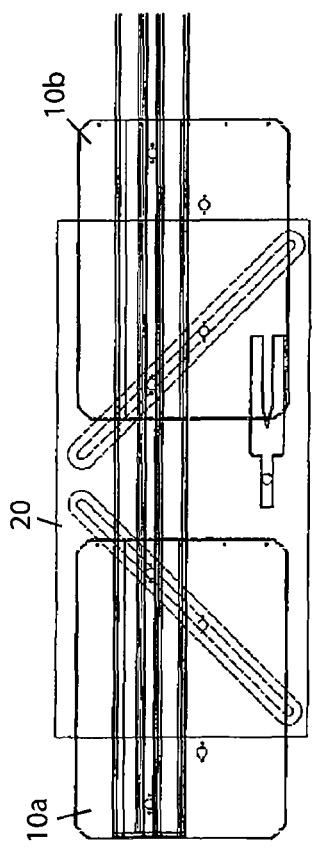
FIG. 12B
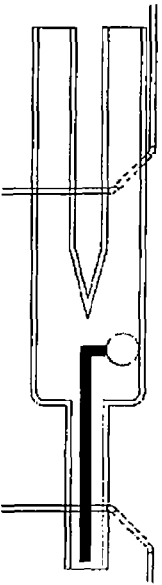
FIG. 12C
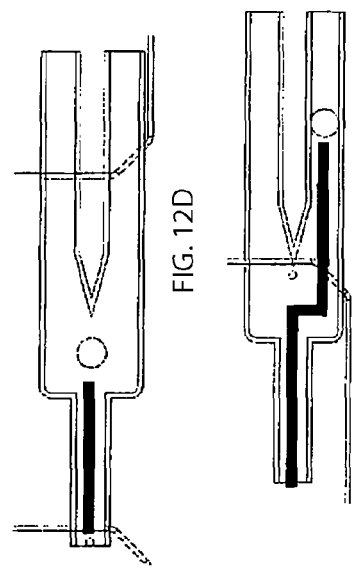
FIG. 12D
FIG. 12E
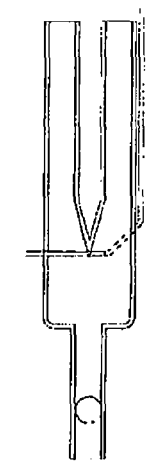
FIG. 12F

Pallet Articulation – Example Vehicle & Components

Pallet Articulation – Example Guideway Switch

Pallet Articulation – Example Guideway Switch
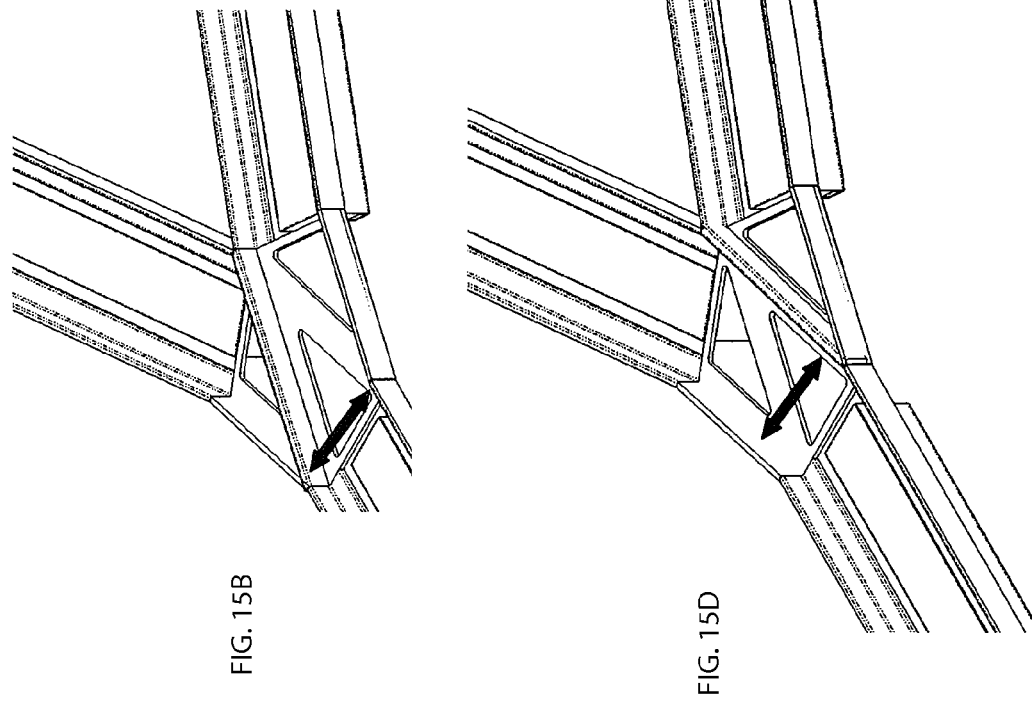
FIG. 15B
FIG. 15D
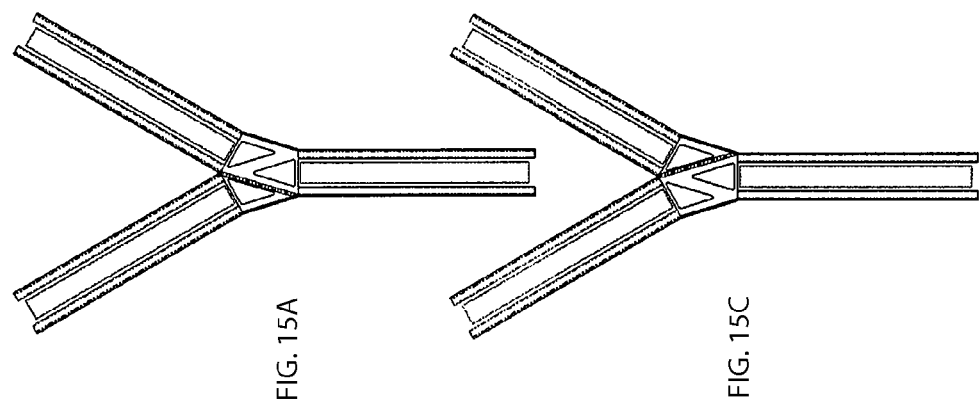
FIG. 15A
FIG. 15C

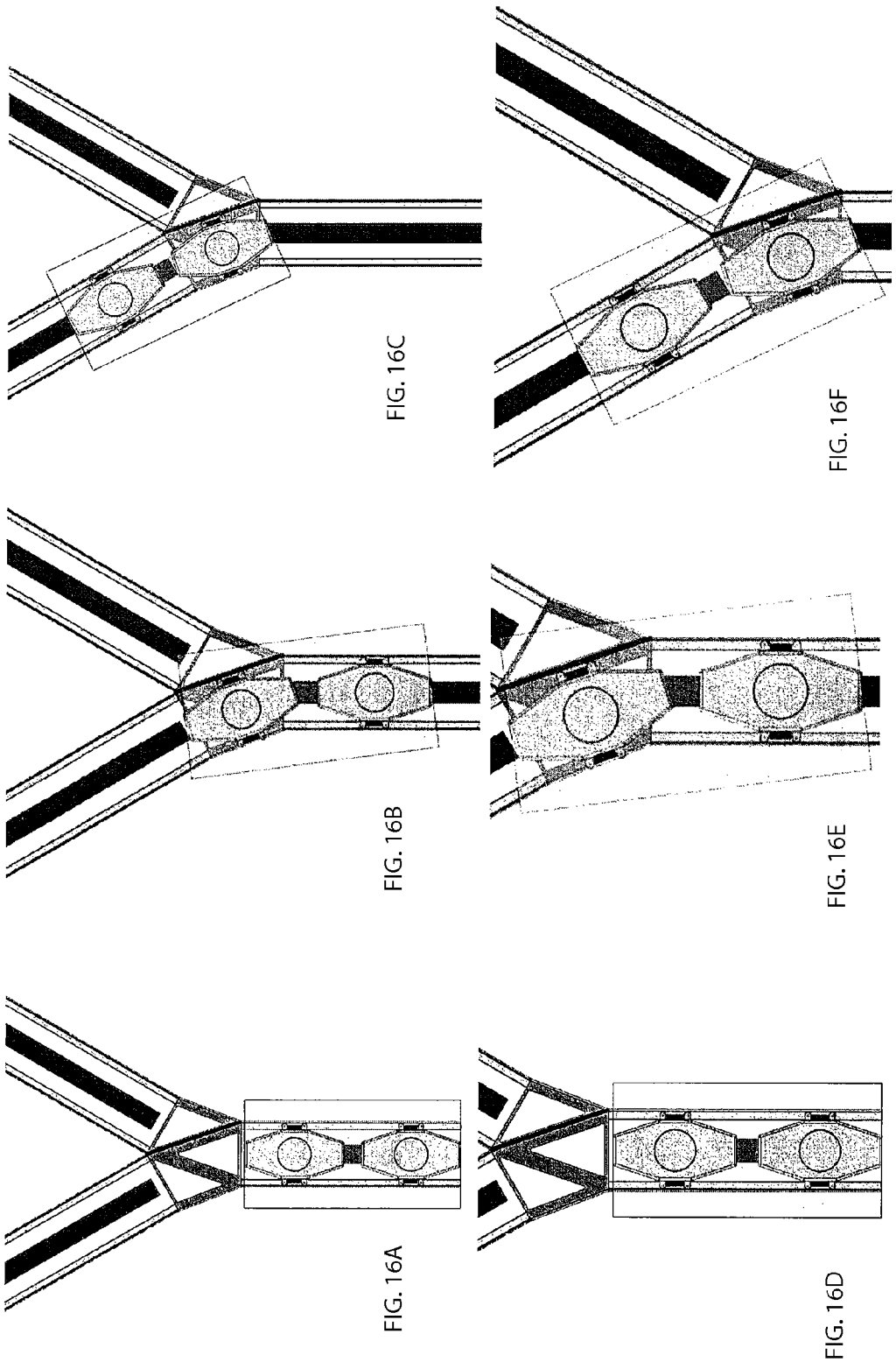

Pallet Articulation Examples – Guideway Switch

THREE-DIMENSIONAL MOTION USING SINGLE-PATHWAY BASED ACTUATORS

PRIORITY

This Application is a continuation of, and claims the benefit of priority of, copending, commonly assigned U.S. patent application Ser. No. 11/123,385, filed May 6, 2005, entitled "Three-Dimensional Motion Using Single-Pathway Based Actuators," which itself claims the benefit of priority to U.S. Provisional Application Ser. Nos. 60/569,168, filed May 7, 2004, entitled "Three-Dimensional Motion Using Single-Pathway Based Actuators" and 60/669,057, filed Apr. 6, 2005, entitled "Three-Dimensional Motion Using Single-Pathway Based Actuators." The teachings of the foregoing applications are hereby incorporated by reference in their entirety.

BACKGROUND OF THE INVENTION

The invention pertains to methods and mechanisms to achieve three dimensional (3D) motion and fixation using pathway-based actuators. The invention has application in transportation, shipping, manufacturing, and other pursuits where it is desirable to move objects along, about and/or transverse to a pathway. By way of non-limiting example, the invention has application to achieving rotation and translation in three dimensions of objects carried by linear machines, including linear motors.

The design and manufacture of linear machines has been carried on for many years, but the applications have been primarily for motion along a single pathway or the use of two linear machines to create motion along more than one pathway. The increased use of synchronous motors is due to the evolution of microprocessors designed specifically for motor control, the availability of more cost effective power electronics, and better permanent magnets. The Linear Synchronous Motor (LSM) has benefited from advances in rotary synchronous motor technology and for many applications allows performance and cost advantages as compared with alternatives such as conveyor belts and rotary motors. There are also advantages when compared with other types of linear motors, such as the Linear Induction Motor (LIM) and the Linear Reluctance Motor (LRM).

There are several problems that linear machine designers must address: decreasing cost, reducing size and weight, increasing efficiency, eliminating cogging or ripple force, simplifying manufacturing, providing precise stopping and providing movement along more than one pathway. This patent addresses the issues of multi-pathway movement and precise stopping while retaining reduced cost, good efficiency, reduced ripple force and simplified manufacture.

Linear motors have been constructed in a manner to allow multidimensional control, but they all use two or more motor pathways to achieve multidimensional motion. Examples include: U.S. Pat. No. 3,376,578, Magnetic positioning device; U.S. Pat. No. 5,368,425, Multi-axis linear motor positioner with y-axis supported at single end; U.S. Pat. No. 5,763,966, Single plane motor system generating orthogonal movement; U.S. Pat. No. 5,938,577, Symmetrical, multi-axis linear motor machine tool; U.S. Pat. No. 6,175,169, Closed-loop planar linear motor with integral, monolithic three-degree-of-freedom ac-magnetic position/orientation sensor; U.S. Pat. No. 6,445,093, Planar motor with linear coils arrays; and U.S. Pat. No. 6,703,806, XYZ-Axes Table.

In view of the foregoing, an object of the invention is to provide improved methods and apparatus for moving people, packages, materials and other things.

A related object is to provide such methods and apparatus as are adapted for achieving rotational and translational motion of objects relative to a pathway.

A further related object is to provide such methods and apparatus as are adapted for achieving such motion using actuators that move along and/or define such a pathway.

Yet a still further related object is to provide such methods and apparatus as are adapted for use with linear motors.

SUMMARY OF THE INVENTION

The foregoing are among the objects attained by the invention which provides, inter alia, novel mechanisms and methods for effecting rotational and translational motion in three dimensions of objects carried by, or coupled to, actuators that move along a pathway. Vehicles or other conveyances (collectively, "vehicles") that utilize mechanisms and methods can increase the performance of and decrease the cost of transportation, shipping, manufacturing, materials handling and other systems.

In one aspect, the invention provides such a vehicle or other conveyance having two (or more) actuators adapted for movement along a pathway. The actuators are propelled or otherwise capable of motion, relative to each other so that the distance between them can be increased or decreased. When desired, that distance can also be maintained the same, e.g., regardless of whether the actuators are moving along a pathway. A pallet, carriage or other moveable part (collectively, pallet) is moveably coupled to the actuators so that at least selected motions by the actuators relative to one another on the pathway effect rotational and/or translational motion of the pallet in three dimensions relative to the pathway, including, for example, movement transverse to the pathway and out of a plane of the pathway.

Further aspects of the invention provide a conveyance as described above in which the actuators move along a pathway defined by primaries (or secondaries) of one or more linear synchronous motors (LSMs). Those primaries (or secondaries) may comprise, for example, sections or "blocks" of an LSM track or guideway. The actuators, conversely, may comprise secondaries (or primaries) of the LSMs, so that as the blocks' primaries (secondaries) are energized the actuator's secondaries (primaries) are subjected to a translational force—thereby causing the actuators, themselves, to move.

Related aspects of the invention provide a conveyance as described above in which the actuators are disposed for relative motion with respect to one another when at least the secondary (primary) associated each actuator is disposed over the primary (secondary) associated with different respective blocks.

Further related aspects of the invention comprise a controller for selectively actuating the primary of the linear synchronous motor associated with said blocks so as to effect motion of the actuators relative to one another.

In other aspects, the invention provides conveyances as described above in which the pallet comprises first and second coupling members, each of which couples with a corresponding member on a respective one of the actuators. Movement of the actuators relative to one another—and, thereby, movement of the coupling member on each actuator relative to the respective one of the first and second coupling members on the pallet—causes rotational and/or translational motion of the pallet in three dimensions relative to the pathway, including, for example, movement transverse to the pathway and out of a plane of the pathway.

Related aspects of the invention provide conveyances as described above in which (i) the first and second coupling members comprise slots (or other indented members) and (ii) the corresponding coupling members on the actuators comprise pins (or other protruding members) that mate with those slots. Contrariwise, the first and second coupling members can comprise pins (or other protruding members) and the corresponding coupling members on the actuators can comprise slots (or other indented members).

In still further related aspects of the invention, the slots (or other indented members) are angled relative to the pathway so that sliding movement of the corresponding pins (or other protruding members) relative thereto causes rotational and/or translational motion of the pallet in three dimensions relative to the pathway.

Still further aspects of the invention provide stop members that couple with or otherwise engage the pallet and, thereby, (i) inhibit rotational and/or translational motion caused by the actuators, e.g., at a precise repeatable position, thereby eliminating the need for externally actuated hard stops, and/or (ii) further enhance such rotation and/or translations (e.g., by causing pivoting).

Yet still other aspects of the invention provide methods of inter-operating actuators and pallets in accord with the above in order to affect rotational and/or translational motion in three dimensions of objects in relative to a pathway.

LSM-based methods and apparatus according to the invention provides increased performance at decreased manufacturing cost in comparison with those produced according to presently accepted methodologies by:
  i. Elimination of the second motor pathway used to actuate multi-dimension movement.
  ii. Elimination of the need for separate actuators to create hard stops.
  iii. Elimination of the need for unique motor parts that may be necessary for curves, corners and switches in a linear motor layout.

The invention provides, inter alia, for use of these methodologies in a variety of combinations to achieve a wide range of motions and superior ratio of performance to cost. Thus, according to one aspect of the invention, there are provided vehicles and control logic that provide motion in a direction other than the motor axis, thereby eliminating the need for a second motor and control.

Still other aspects of the invention provided fixtures and control logic to provide motion around corners, thereby eliminating the need for special motor elements for curves and corners. These and still other aspects of the invention are evident in the drawings and in the description that follows.

BRIEF DESCRIPTION OF THE DRAWINGS

A more complete understanding of the invention may be attained by reference to the description below, taken together with drawings, in which:

FIGS. 3A-3D show differential motion of two independently controlled pallets propelled by a single-axis linear machine with multiple primaries in a system according to one practice of the invention.

FIGS. 4A-4D show how differential motion of two pallets propelled by a single-axis linear machine can produce off-axis motion of a platform in a system according to one practice of the invention.

FIGS. 5A-5D show an alternate way to create off-axis motion, in this case for a linear machine with a vertical axis, in a system according to one practice of the invention.

FIGS. 8A-8D show a method of creating fixation via slots on the platform that engage pins on the guideway in a system according to one practice of the invention.

FIGS. 9A-9D show a method of creating rotary motion via linkages between the pallets and platform in a system according to one practice of the invention.

FIGS. 11A-11D show how differential motion of two pallets can be used to move a pin laterally and thereby eject an object on the platform in a system according to one practice of the invention.

FIGS. 12A-12F show how differential motion of two pallets can cause a vehicle to switch to either of two guideways without any actuation mechanism on the guideway in a system according to one practice of the invention.

FIGS. 13A-17F show depict mechanisms for switching according to further embodiments of the invention.

DETAILED DESCRIPTION OF THE ILLUSTRATED EMBODIMENTS

Theory of Operation

The illustrated embodiment employs combinations of design techniques to achieve multidimensional motion for a variety of types of applications including material handling, transportation, assembly automation, and packaging. The discussion and figures refer to a linear synchronous machine with permanent magnet field, but the teachings are applicable to a wide class of linear machines (that is, of machines with actuators that move along a linear (or non-linear) pathway. The illustrated embodiment provides a means for a multiplicity of multi-pathway motions via the independent movement of two or more linear propulsion mechanisms acting along a single motor pathway.

Figure 1A:
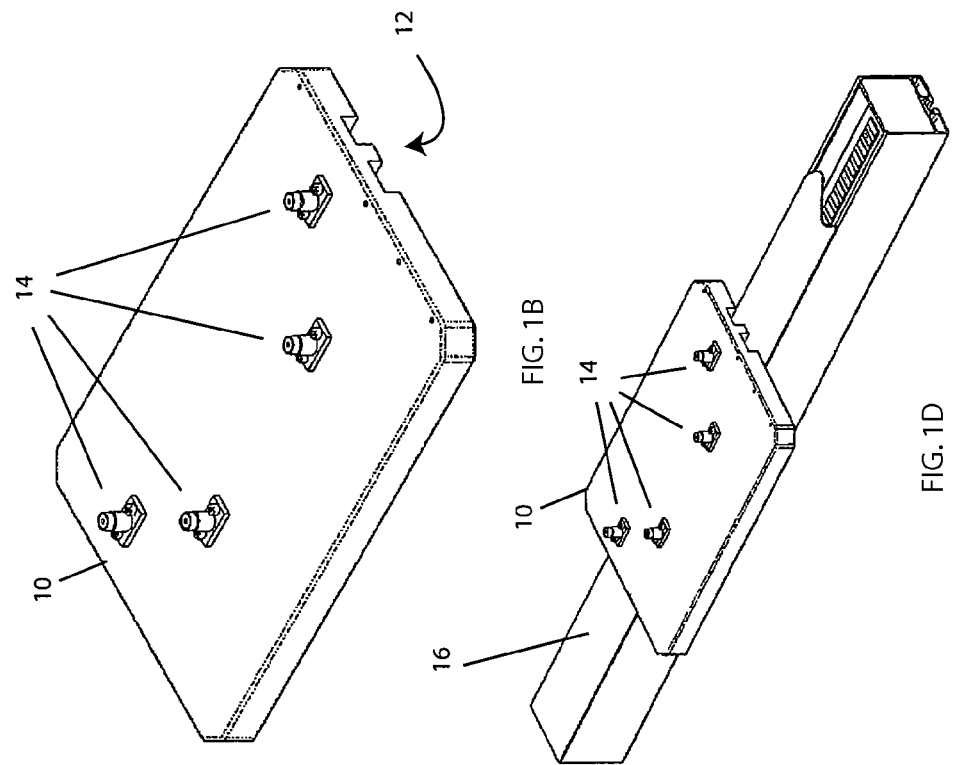
FIGS. 1A-1C show views of a pallet of the type used in one practice of the invention with guide pins on top and FIG. 1D shows a 3D view of the pallet moving over linear motor primaries of the type used in one practice of the invention.
Figure 1B:
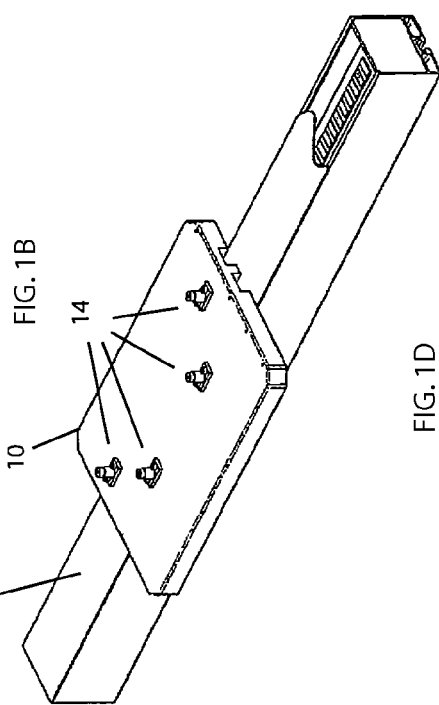
Figure 1C:
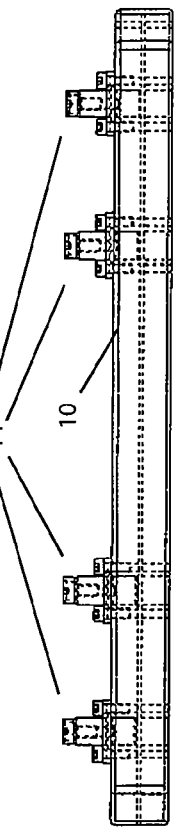
Figure 1D:
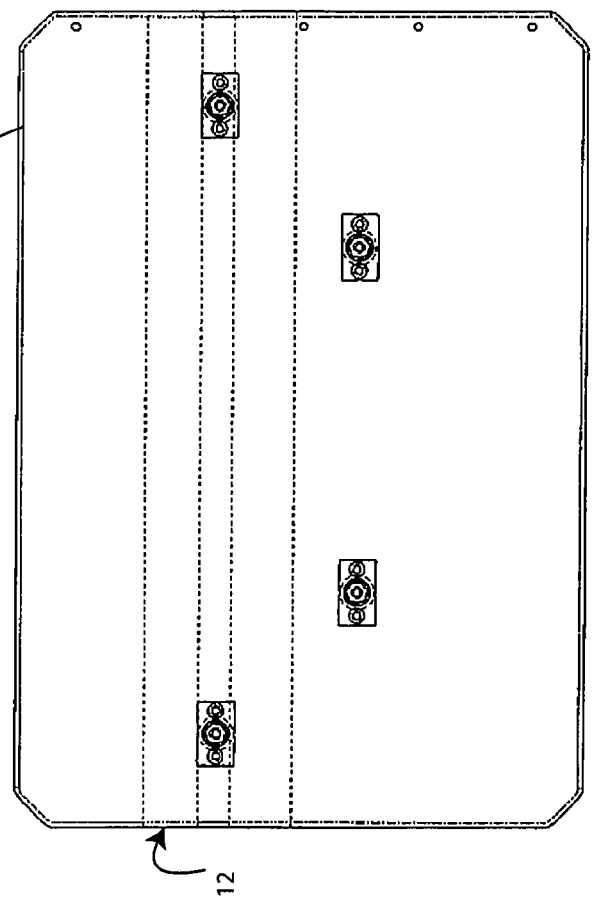

A building block for the illustrated embodiment, shown in Figs. 1A-1C, consists of a pallet 10 with a linear motor secondary 12 (indicated by dotted lines) on one side and guide pins or posts 14 on the other side. FIG. 1D shows the pallet being propelled along a guideway by a linear motor primary 16 that creates a force on the secondary. Two of these pallets can be propelled along a single motor pathway with independent control of the pallets.

Figure 2B:
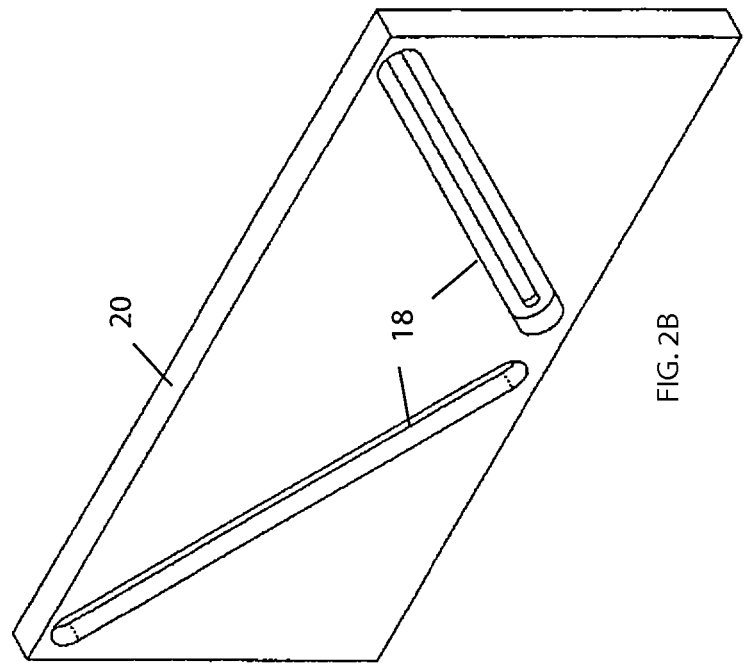
FIGS. 2A-2C show a platform of the type used in one practice of the invention with guide slots on the bottom.
Figure 2A:
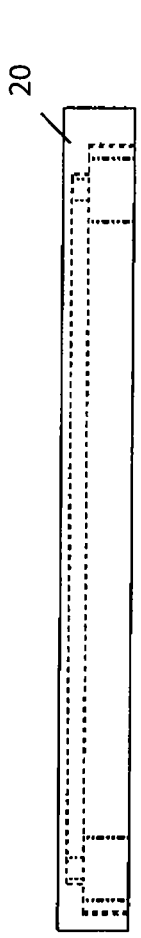
Figure 2C:
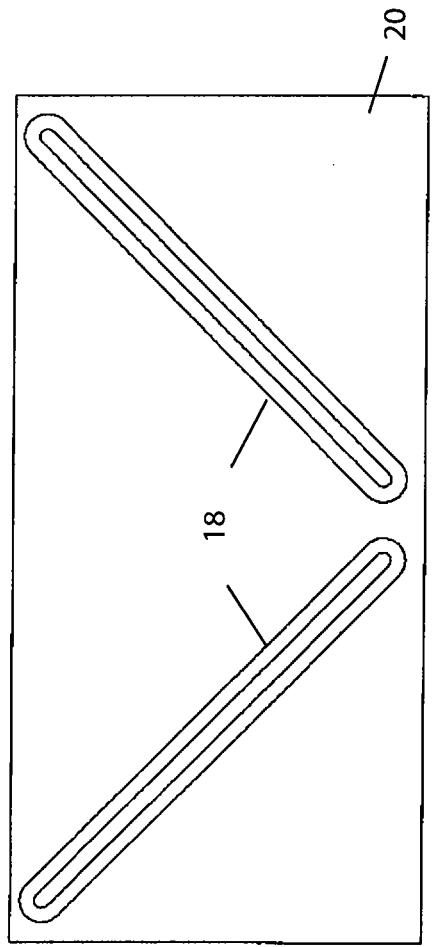
Figure 6A:
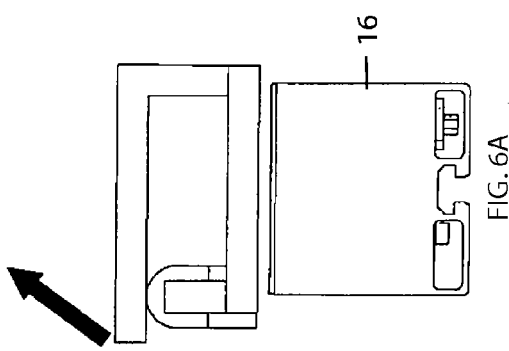
FIGS. 6A-6D show one way to tilt a platform via differential motion of two pallets propelled by a single-axis machine in a system according to one practice of the invention.
Figure 6B:
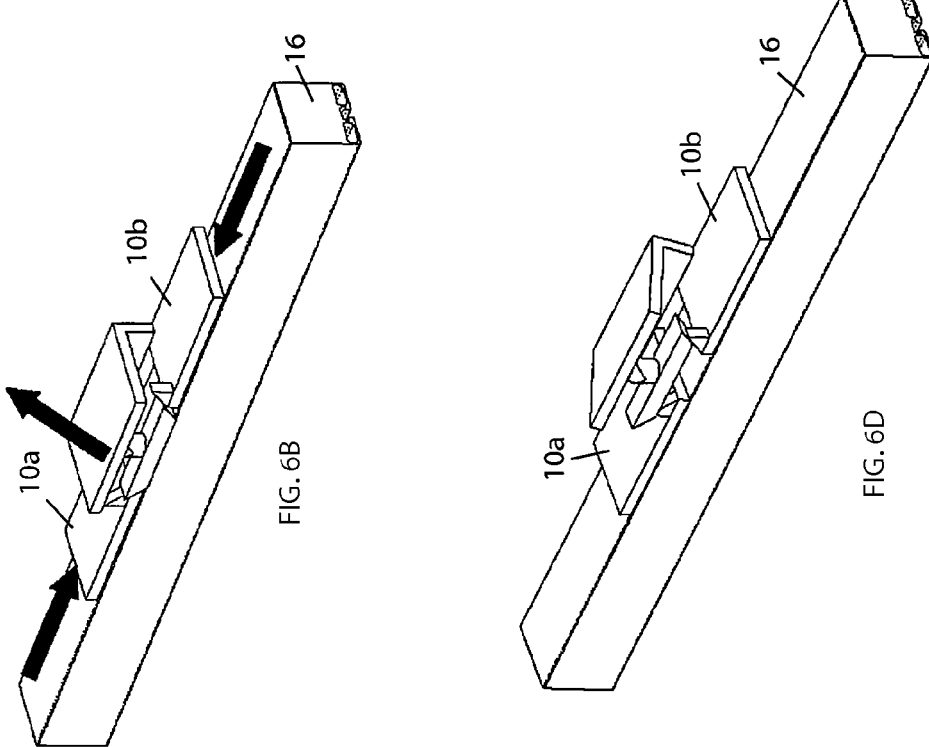
Figure 6C:
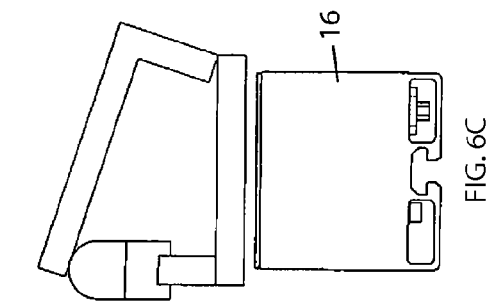
Figure 6D:
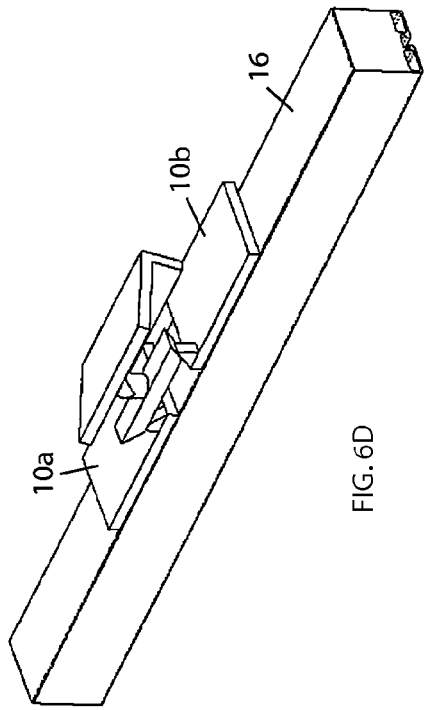
Figure 7A:
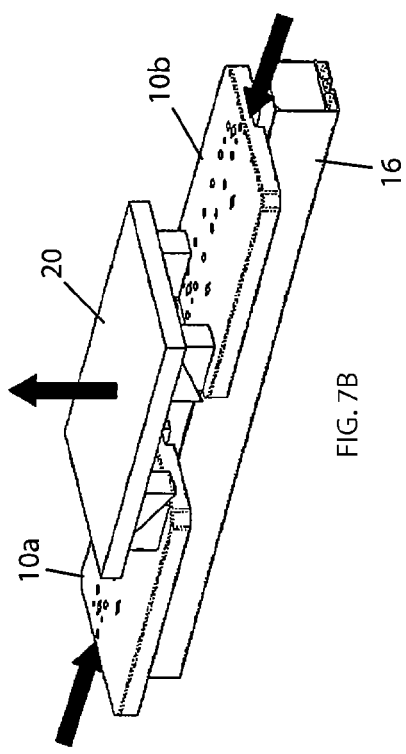
FIGS. 7A-7D show one way to create vertical motion via differential motion of two pallets propelled by a single-axis linear machine in a horizontal plane in a system according to one practice of the invention.
Figure 7C:
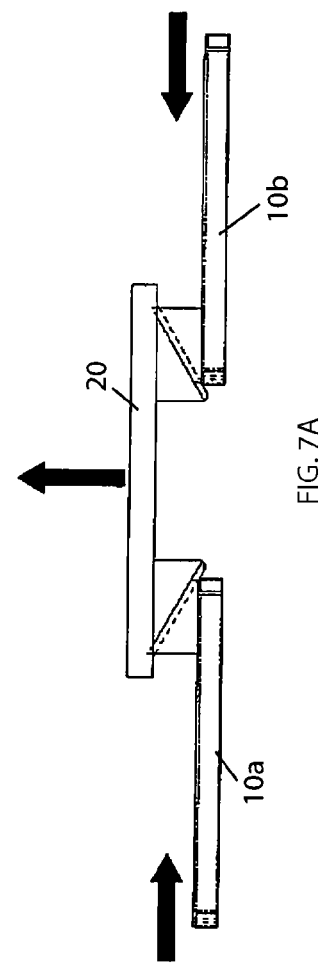
Figure 7B:
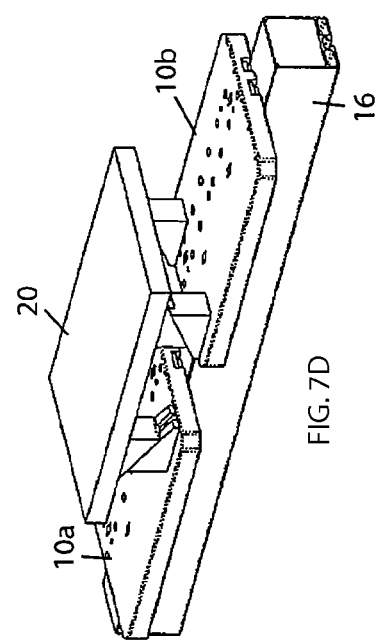
Figure 7D:
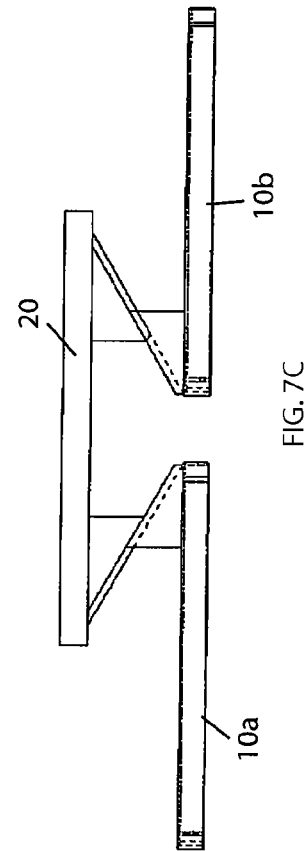

A vehicle is constructed by mounting a platform 20 on top of a multiplicity of pallets. The platform, shown in FIG. 2, has slots 18 on its underside that engage the pins on the pallets. These slots are angled so as to allow off-axis motion. The two pallets 10a, 10b can be independently controlled, as shown in FIG. 3.

FIG. 4 shows aspects of the illustrated embodiment. When the pallets are propelled in the same direction and at the same speed the vehicle, i.e. the pallets and platform, moves in the direction of the motor axis. When the pallets are commanded to move towards one another they create motion in one off-axis direction and when they move away from each other they create off-axis motion in the opposite direction. The result is a method for creating motion in a direction different from the motor axis.

Examples of Off-Axis Motion

FIGS. 5A-5D show another way to create off-axis motion. This FIG. also shows how a motor with a vertical axis can create motion in the horizontal direction.

FIGS. 6A-6D show how differential motion between two pallets can produce tilting motion of a platform.

FIGS. 7A-7D show how differential motion between two pallets moving in the horizontal direction can move a platform in the vertical direction.

Fixation

Some applications require the platform to be moved to a precisely located position and to stay there while some operation takes place. For example, in assembly automation a platform is moved to a precise position under a robot which then performs an operation on a part mounted on the pallet. The position must be very accurately controlled, often to a tolerance on the order of 10 micrometers, and this position must be maintained while considerable force is applied to the part. With conventional conveyor belt technology a "hard stop" is moved into the path of the vehicle by an external actuator and the conveyor belt pushes the platform into the stopping mechanism. The stopping mechanism and its actuator are expensive and create a limit to the speed of the conveyor. With conventional linear motor technology a very precise position sensing system must be used and the motor controller must create a very rigid stop; both of these features add considerable cost. With the technology disclosed herein the vehicle can be pushed in an off-axis direction into a fixed stopping mechanism with substantial saving in cost and reduction in the number of moving parts.

FIGS. 8A-8D illustrate the use of horizontal off-axis motion to create fixation. The platform has one or more tab and each tab has a slot that can engage a fixed pin on the side of the guideway. In order to create a "hard stop" for the platform a multiplicity of pins on the guideway are used to determine where the pallets stop. The linear motor moves the platform along the motor axis until the slots line up with the selected pins and then differential motion of the pallets causes the platform to move sideways so as to engage the pins. The motors continue to push against the pins and thereby create a precise stop, even in the presence of lateral disturbing forces. Typically a pair of pins is used to determine each stopping point and this way both the translational and rotational position of the pallet can be accurately controlled. A multiplicity of pin pairs is used to create a multiplicity of stopping places.

Rotation

FIGS. 9A-9D show a way to create rotational motion. Linkages are used to couple the platform to the pallets in such a way that differential linear motion of the pallets causes rotational motion of the platform.

Cornering

Cornering poses two problems for vehicle propulsion using linear machines: it is expensive to make a curved linear motor primary, and a linear motor secondary can not maintain alignment with a curved primary unless it articulated. If the curve radius is large these problems are minimal but it is virtually impossible to negotiate very sharp curves. Some applications, such as assembly automation, demand the use of sharp turns because of space limitations.

Figure 10A:
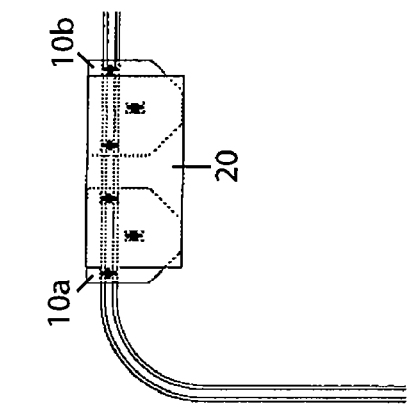
FIGS. 10A-10F show how a pivoting platform can negotiate a sharp curve without the use of a curved section of a linear machine in a system according to one practice of the invention.
Figure 10C:
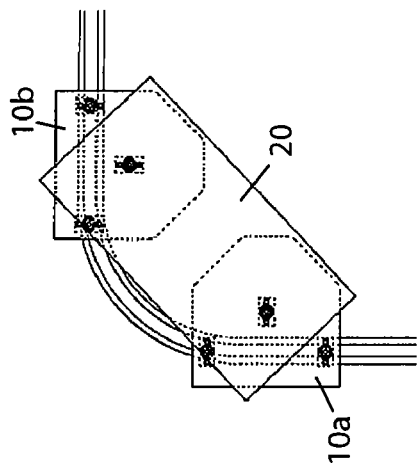
Figure 10E:
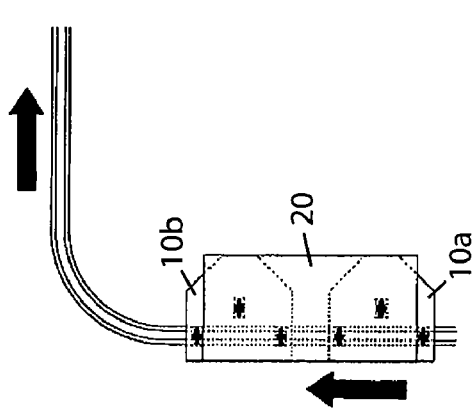
Figure 10B:
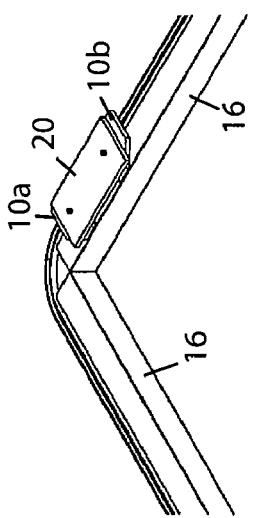
Figure 10D:
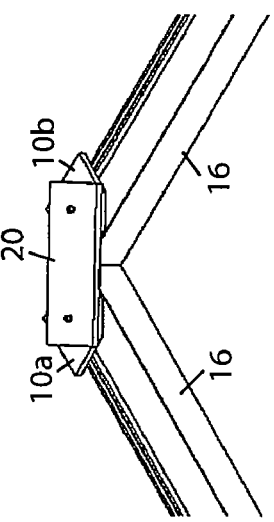
Figure 10F:
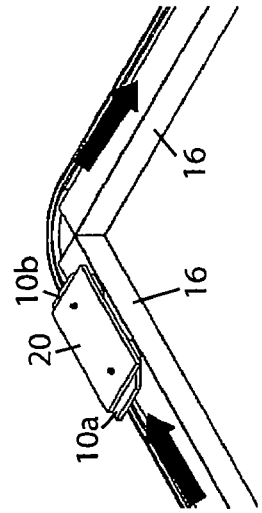
Figure 13B:
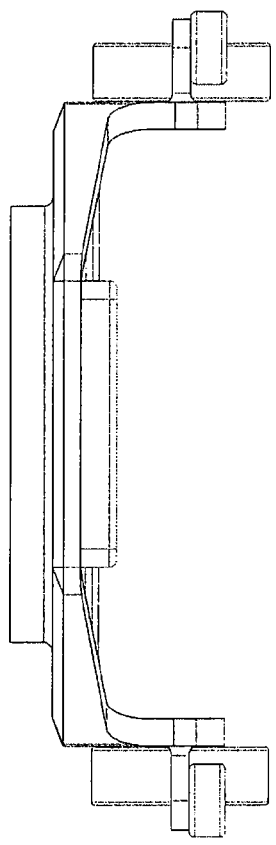
Figure 13A:
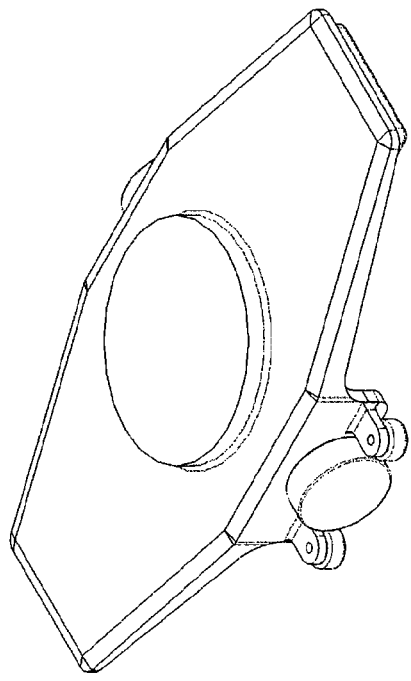
Figure 13C:
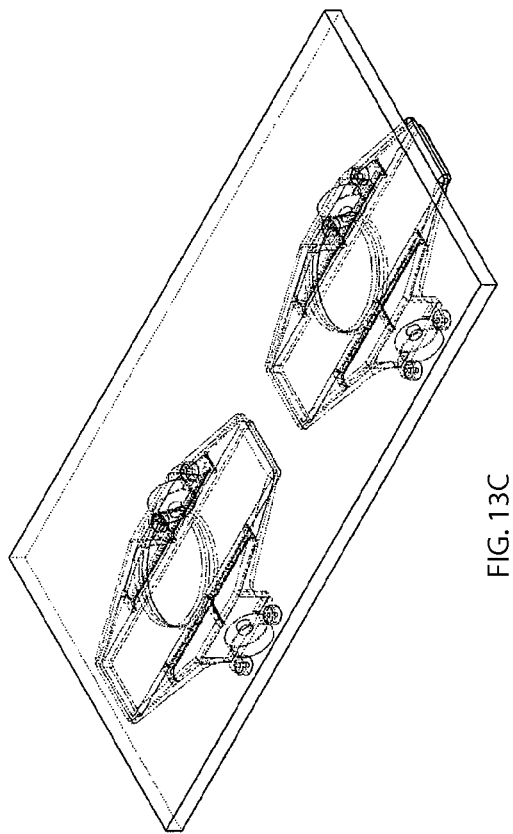
Figure 14A:
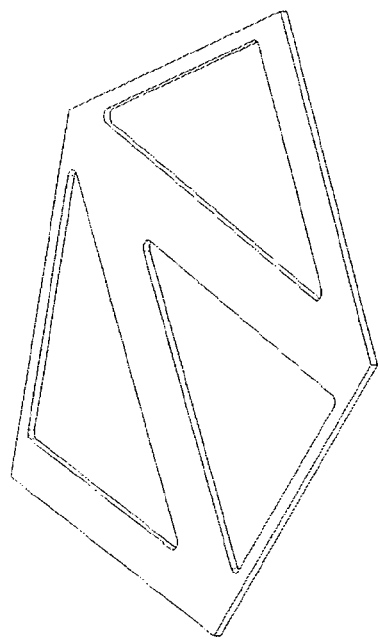
Figure 14C:
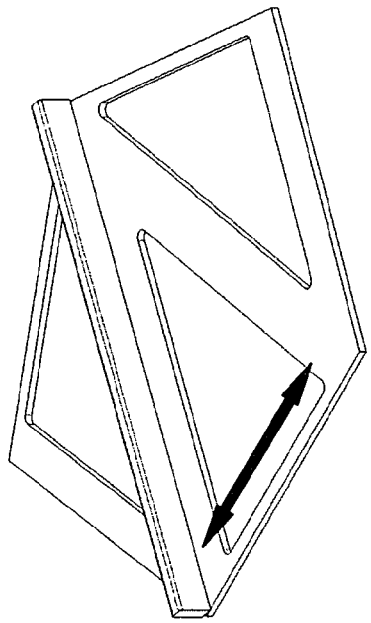
Figure 14B:
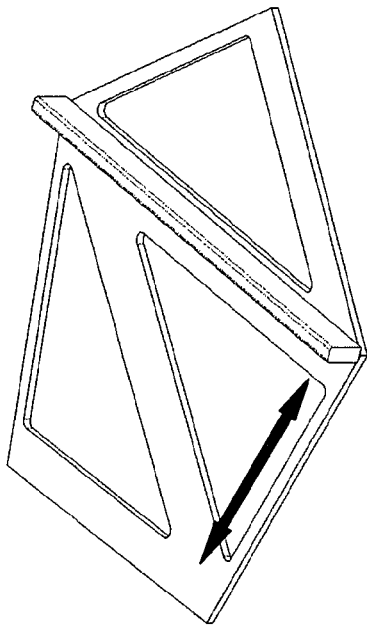
Figure 17B:
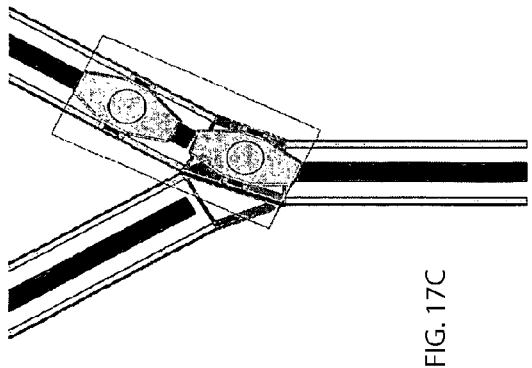
Figure 17C:
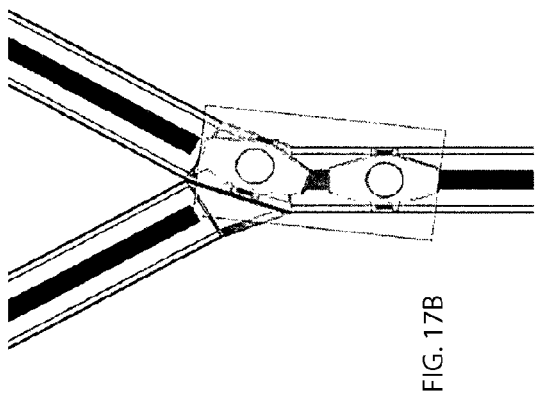
Figure 17A:
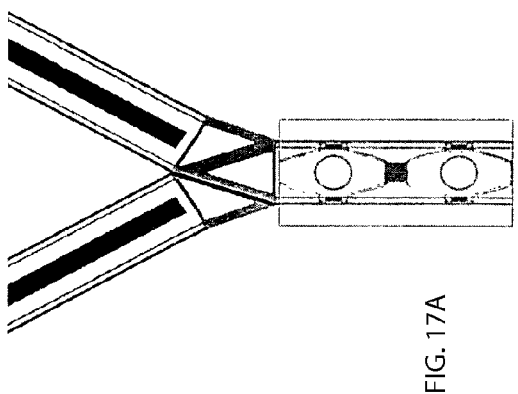
Figure 17E:
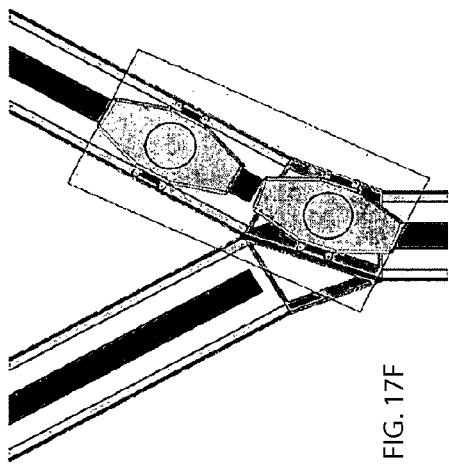
Figure 17F:
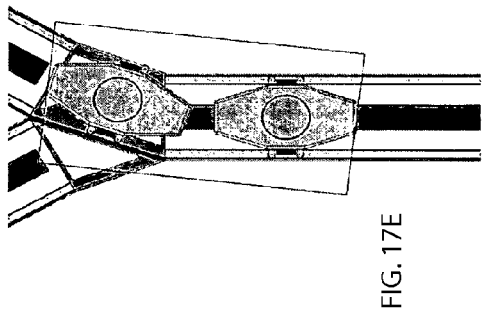
Figure 17D:
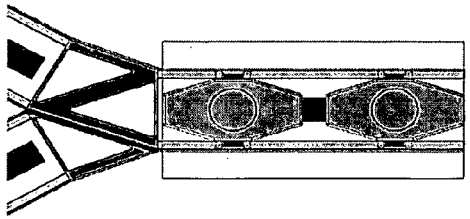

FIGS. 10A-10F show an example of how two pallets can move a platform around a sharp turn without the necessity of having a curved linear motor primary. In FIGS. 10A-10B the vehicle is approaching the turn, in FIGS. 10C-10D the vehicle is negotiating the turn, and in FIGS. 10E-10F the vehicle has completed the turn. The platform pivots on the two pallets and moves around the turn. Pins on the guideway guide the pallets around the turn, but there is no need to propel the pallets while they are turning.

Ejection

In some cases it is desirable to be able to move an object mounted on the platform, e.g. to eject an object from the platform. This can be accomplished by the means shown in FIGS. 11A-11D. Here differential motion of two pallets can cause an ejector pin to move sideways and thereby push an object that is sitting on the platform.

Switching

A common problem is to switch a vehicle to either of two guideways according to a control signal. There are many ways to accomplish this but most of them depend on a movable mechanism on the guideway. It is desirable to be able to switch the vehicle via mechanisms located on the vehicle so that a following vehicle does not have to depend on the mechanism working correctly.

In FIGS. 12A-12E there are posts on the pallets propelled by the linear motors, These posts and associated platform mechanisms guide the forward pallet through a switch. By positioning a pin in one groove or another the vehicle is switched between alternate linear motor paths. As the motor secondaries are commanded to move towards one another the pin shifts to the left of the direction of motion. When the motor secondaries are commanded to move apart the pin shifts to the right the direction of motion. The control logic can command the secondaries to move in unison to provide linear propulsion. Linear movement is independent of the off axis pallet position.

Controller

A controller (not shown) energizes linear motor primary "blocks" that make up the guideway. In the illustrate embodiments those blocks are sized between one and five times the length of the individual pallets, though other block sizes can be used. In order to effect the motions shown in FIGS. 3A-3D, et seq., and discussed above, the two pallets that make up a conveyance or vehicle are positioned on adjacent blocks and the blocks are energized as discussed below.

The controller effects movement of each two-pallet "vehicle" by using a command that consists of two subcommands—the movement subcommand for the lead pallet and a movement subcommand for the trailing pallet. In this scenario, the longitudinal movement of the platform that is coupled to the pallets will follow the average of the two subcommands, and the off-axis movement will follow a transform of the two commands. (Note that the longitudinal movement need not be the average; the average is just a simple case). If the two commands are the same, only on-axis movement is performed.

An equivalent movement command could also be comprised of an on-axis subcommand and an off axis subcommand. In this scenario, the lead vehicle would follow the on-axis command minus half of the off-axis command and the trailing vehicle would follow the on-axis command plus half of the off-axis command. The longitudinal movement of the platform itself will follow the on-axis command and the off-axis movement of the platform will follow the transformed off axis command (the transformation depends upon the coupling method between the pallets and the platform). (Note that depending on the design of the coupling method, the longitudinal movement of the platform could also follow a different transform of the two movement commands.)

The movement commands can vary in complexity depending on the required movement complexity. The commands may be as simple as move a certain distance in a certain direction when simple off-axis movements are required. The commands may be more complex in nature, such as the specification of movement profiles (cubic functions indicating position, for instance) when more complex movement is required with coordination of off-and on-axis movement. One such application for the more complex case may be laying down a line, circle, or other pattern of glue. Other applications may utilize commands at a high update rate to implement a servo-type system.

One implementation of this type of system would make one pallet the 'slave' to the other 'master' pallet. The controller in charge of the 'master' pallet would send movement commands to the controller in charge of the 'slave' pallet so that the two pallets can move in a coordinated fashion. The controller in charge of the 'master' pallet is also in charge of the whole vehicle, and handles all commands from external systems. This controller is in charge of responding to its own errors, those of the controller of the 'slave' pallet, and those of any controllers in between.

Alternative Switching Embodiment

An alternative to vehicle based switching is shown in FIGS. 13A-17F. For this design the vehicle is guided by wheels mIming on guide rails. In order to switch from one path to another a portion of the middle guide mil is pivoted from one position to another. This pivoting can be done by any means, such as a linear or rotary actuator. In a preferred embodiment the pivoting mechanism has two stable positions and can be switched from one position to the other by force pulse, such as pulsing one or more coils so as to create a magnetic force that overrides the force creating the stable position. The switch can change position in a fraction of a second so vehicles operating with short headway can move through the switch in alternate directions. With the switch in either stable position the vehicle is moved through the switch by the same means used to move it though a curve.

SUMMARY

The use of two or more linear motor secondaries to propel two or more pallets allows a platform on the vehicle to move in directions not aligned with the linear motor axis. The prior discussion explains examples of how this concept can lead to off-axis motion in any direction, fixation, switching, and motion through a sharp curve. An advantage of all of the illustrated embodiments is that there are fewer moving parts and a single control system is required. When compared with conventional technology this can be a significant advantage and leads to lower system cost.

Those skilled in the art can create similar designs based on the teachings hereof. For example, there can be other coupling mechanisms that will create other types of off-axis motion. The use of more than three or more motor secondaries can be used to create even more complex off-axis motion. In addition, those skilled in the art will appreciate that the teachings herein can be applied to conveyance systems including guideways (e.g., as described above) oriented in any direction, including, for example, horizontal and vertical.

I claim:
1. A system for conveyance comprising
    A. a guideway comprising a linear synchronous motor (LSM) primary,
    B. two or more actuators disposed on the guideway, each actuator comprising a linear synchronous motor secondary that is propelled along the guideway by the linear synchronous motor primary,
    C. a vehicle coupled to the two or more actuators,
    D. the guideway guides the vehicle around a turn without propelling a said actuator while that actuator is on said turn.
2. The system of claim 1, wherein at least a portion of the guideway defines a pathway that is curved.
3. The system of claim 2, wherein the actuators are adapted for any of moving, pivoting and turning the vehicle around the curved portion of the pathway.
4. The system of claim 2, wherein the actuators effect movement of the vehicle around the curved portion of the pathway in response to to one or more movement commands.
5. The system of claim 2, wherein the curved portion of the pathway comprises at least two track segments positioned at an angle with respect to one another.
6. The system of claim 5, wherein the actuators are adapted for any of moving, pivoting and turning the vehicle around a corner from the first track segment to the second track segment.
7. The system of claim 1, wherein the guideway is oriented in a vertical direction.
8. The system of claim 1, wherein the actuators and vehicle are adapted for guidance through a switch.
9. The system of claim 1, wherein the guideway guides the vehicle around a turn while propelling another of said actuators.
10. A system for conveyance comprising
    A. a curved guideway comprising a linear synchronous motor (LSM) primary,
    B. two or more actuators disposed on the guideway, each actuator comprising a linear synchronous motor secondary that is propelled along the guideway by the linear synchronous motor primary.
    C. a vehicle coupled to the two or more actuators,
    D. the guideway guides the vehicle around a turn without propelling a said actuator while that actuator is turning.
11. The system of claim 10, wherein the guideway guides the vehicle around a turn while propelling another of said actuators.
12. A method of conveyance, comprising
    providing a guideway comprising a linear synchronous motor (LSM) primary;
    providing two or more actuators adapted for movement relative to each other on the guideway and a vehicle coupled to the two or more actuators; and
    guiding the vehicle around a turn without propelling a said actuator while that actuator is turning.
13. The method of claim 12, further comprising the step of moving the vehicle around a corner from a first track segment to a second track segment, the second track segment positioned at an angle with respect to the first track segment.
14. The method of claim 12, further comprising guiding the vehicle around a turn while propelling another of said actuators.

* * * * *